United States Patent [19]

Mirlieb et al.

[11] Patent Number: 5,042,662

[45] Date of Patent: Aug. 27, 1991

[54] CONTAINER FOR RECEIVING SHEET MATERIAL

[75] Inventors: Bernd Mirlieb, Fellbach; Alfred Trumpp, Stuttgart; Gunter Weber, Ostfildern, all of Fed. Rep. of Germany

[73] Assignee: Eastman Kodak Company, Rochester, N.Y.

[21] Appl. No.: 617,940

[22] Filed: Nov. 27, 1990

Related U.S. Application Data

[63] Continuation of Ser. No. 403,226, filed as PCT EP88/00463 on May. 24, 1988, published as WO88/09526 on Dec. 1, 1988, abandoned.

[30] Foreign Application Priority Data

May 29, 1987 [DE] Fed. Rep. of Germany ....... 3718130

[51] Int. Cl.⁵ ............................................. B65D 85/48
[52] U.S. Cl. .................................... 206/455; 206/485
[58] Field of Search ............... 206/449, 451, 454, 455, 206/456, 459, 526, 555, 556, 485; 354/275, 276; 378/182

[56] References Cited

U.S. PATENT DOCUMENTS

| | | | |
|---|---|---|---|
| 2,320,835 | 6/1943 | Tathwell | 206/391 |
| 3,155,264 | 11/1964 | Shook | 220/4 E X |
| 3,384,228 | 5/1968 | Cannon | 206/485 |
| 3,521,748 | 7/1970 | Layne | 206/451 |
| 3,858,720 | 1/1975 | Flagler | 206/455 |
| 4,060,929 | 12/1977 | Meyer et al. | 220/4 E X |
| 4,350,248 | 9/1982 | Bauer | 206/455 |
| 4,407,411 | 10/1983 | Lowry | 206/454 X |
| 4,681,227 | 7/1987 | Tamura et al. | 206/455 |
| 4,778,056 | 10/1988 | Faulstick et al. | 206/449 X |
| 4,783,019 | 11/1988 | Schmidt et al. | 206/455 X |
| 4,791,282 | 12/1988 | Schmidt et al. | 378/182 X |
| 4,828,106 | 5/1989 | Akao et al. | 206/455 X |
| 4,909,386 | 3/1990 | Jeffers | 206/485 X |

FOREIGN PATENT DOCUMENTS 1298412 12/1972 United Kingdom ............... 206/455

Primary Examiner—Jimmy G. Foster
Assistant Examiner—Jacob K. Ackun, Jr.
Attorney, Agent, or Firm—G. Herman Childress

[57] ABSTRACT

Container for a stack of sheets such as photographic film or paper, which is readily adaptable to a wide variety of formats by inserting plug-in elements into recesses in the bottom alone or in both the bottom and the cover of the container.

11 Claims, 6 Drawing Sheets

CONTAINER FOR RECEIVING SHEET MATERIAL

This application is a continuation of application Ser. No. 07/403,226 filed as PCT EP 88/00463 on May 24, 1988, published as WO 88/09526 on Dec. 1, 1988, now abandoned.

TECHNICAL FIELD

The invention relates to a container for sheet material such as photographic film or paper, in particular a supply magazine, cassette or the like, having size-defining elements for the inner space of the container, which elements can be easily adapted to various sheet formats.

BACKGROUND ART

Offenlagunstag DE-PS 31 22 583, Feb. 3, 1983, shows an x-ray film which can be adapted to several specific formats by using a plurality of magazine inserts. Each format is associated with a separate insert so that when the format is changed, insert for the new format is required. In order to be able to adapt the supply magazines to frequent changes in film formats, a great number of magazine inserts has to be available.

In the case of a common-type supply magazine for X-ray sheet film, pre-marked screw positions are provided on the outer side of the cassette bottom, which are associated with sheet-film formats and serve for selectively screwing size-defining bars in the inner space of the cassette in predefined positions. Once a format has been selected, it cannot be changed because the bars are fastened by screws.

In connection with a cassette for a photographic plate, it is also known (DE-GM 1 241 199) for an insert to be provided in the form of two pairs of bars which engage each other and can be adapted to various plate sizes by changing that engagement. However, such an insert for relatively thick plates is not practical for properly positioning a single thin sheet of film or a stack of film sheets.

DISCLOSURE OF THE INVENTION

The present invention provides a container of the generic type, modified so that it is readily adaptable to receive and position stacks of sheets in various formats without constructional changes being made or without any additional elements having to be provided. By "format" is meant the size and shape of sheets, for example, 18×24 cm., 35×35 cm., etc.

According to the invention, size-defining elements are designed as plug-in elements whose positions can be changed, which can be placed into recesses in the bottom and/or the cover of the container, and which bridge the vertical distance between the upper surface of the bottom and the lower surface of the cover.

An advantageous embodiment of the invention has each sheet format associated with a plurality of oppositely positioned recesses in the bottom and the cover of the container, into which size projections on plug-in bars can be placed.

In a further embodiment of the invention, an inner wall of the lower container portion, which is positioned in the loading and unloading area, serves as a boundary for all sheet formats.

In still another advantageous embodiment of the invention, three inner walls of the lower container portion serve as boundaries for the largest sheet format, and the fourth boundary is defined by the plug-in elements. Advantageously, the container is wide enough in a direction parallel with the plug-in elements defining the fourth boundary, to provide storage for plug-in elements not in use, by means of suitable recesses in the bottom and cover.

Advantageously, the plug-in elements are designed as cylindrical plugs. Other features and advantages can be inferred from the description of embodiments of the invention illustrated in the drawing, and from the appended claims.

MODES OF CARRYING OUT THE INVENTION

Figure 1:
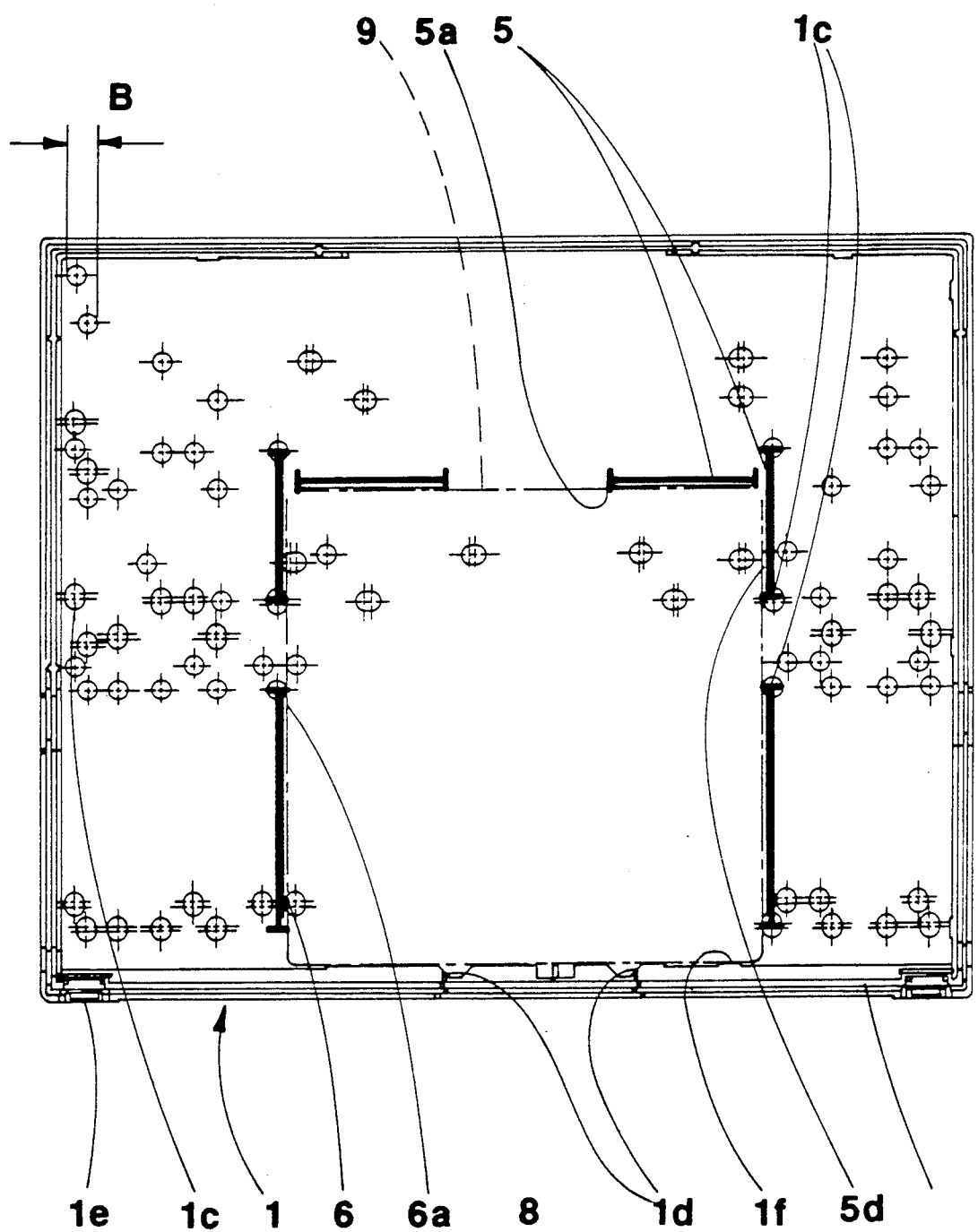
FIG. 1 is a plan view of a container according to the invention, with the cover removed.

The invention will be described with reference to a supply magazine in which a large number of X-ray film sheets (e.g. 110 sheets) are to be stacked. A supply magazine of this type is used in a device for automatically loading X-ray film into an X-ray film cassette, e.g. in accordance with Patent Application P 37 05 851.7.

The supply magazine made of plastic consists of a lower portion 1 with a bottom 1a and with walls 1b arranged perpendicular thereto and extending around said bottom, as well as of a cover 2 covering the upper side of the lower portion 1.

Cover 2 which is screwed to the lower portion 1 comprises two sections, one of which is a lid 3 which is pivotable about a hinge pin 4 and associated with the unloading area of the supply magazine 1, 2. Lid 3 features a metal insert 7 which imparts to lid 3 the weight necessary for automatic closing. The free end of lid 3 is locked to the lower portion 1 by known means not illustrated. When the supply magazine 1, 2 is loaded into the device provided for that purpose, these locking means are disengaged in a known manner not illustrated as soon as the end side 1e strikes against a suitable actuator.

Figure 2:
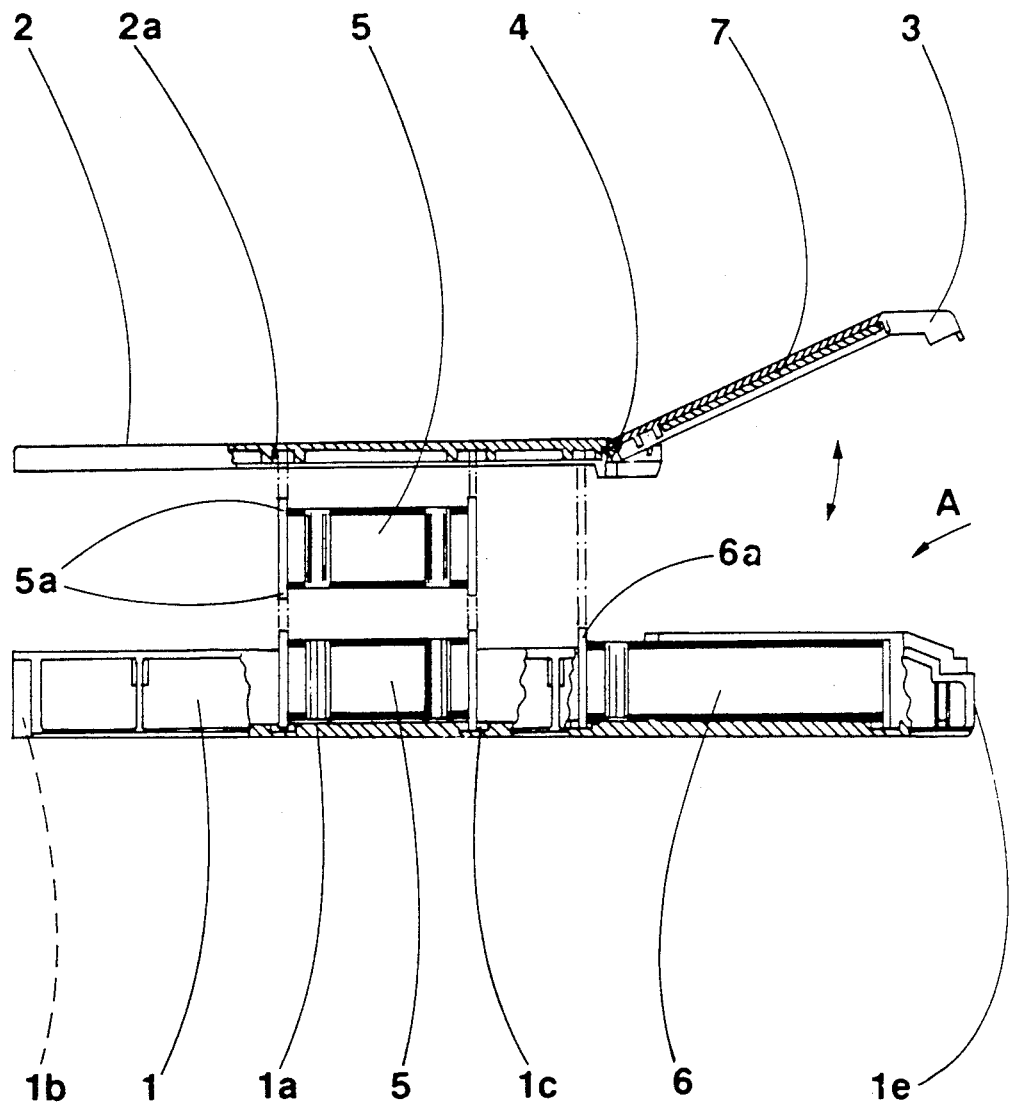
FIG. 2 is an exploded side view of the container according to FIG. 1, one of the plug-in bars 5 being in an exploded position above its position resting on bottom 1 of the container.

Recesses 1c are arranged in the bottom 1a of the lower portion 1, into which recesses members comprising elongated plug-in elements or bars 5 and 6 of two different lengths are placed for defining the size and shape of the format; see FIG. 2. For that purpose, the plug-in bars 5 (the shorter bars), 6 (the longer bars) have parts in the form of projections 5a and 6a, respectively, which extend in opposite directions beyond the upper and the lower edges of said bars, are located at their ends, and are adapted to enter the recesses 1c. As explained below, bars 6 have an upwardly extending projection at only one end. For stabilizing the position of the plug-in bars 5, 6 when inserted, they engage with their upper projections 5a, 6a, recesses 2a in the cover 2. The lower recesses 1c and the upper recesses 2a are positioned opposite each other. For each two recesses 1c in the bottom 1a of the lower portion 1, which are necessary to insert a plug-in bar 5 or 6, one recess is circular and the other recess is designed as an oblong hole extending in the longitudinal direction of the plug-in bar. All of the recesses 2a in cover 2 are designed as oblong holes with their major dimension coinciding with the length of the plug-in bars.

The recesses 1c and 2a, respectively, in the bottom 1a of the lower container portion 1 and in the cover 2 are associated with various sheet-film formats, the recesses 1c in the bottom 1a being provided with numbers relating to the respective format so that when the projections on plug-in bars 5, 6 are placed into the recesses 1c associated with a desired film format, the bars define a sheet stack receiving space having a size and shape corresponding to that format.

In the lower container portion 1, two long plug-in bars 6 and four short plug-in bars 5 are provided, which serve to define the space for the film format desired. The format is usually centered with respect to a center line 8 of the device so that a sheet film which is automatically removed can be transported by a sheet-film removal means in proper orientation to a sheet-film cassette positioned in the device.

The front inner wall 1f of the lower portion 1 serves as a boundary for all sheet formats so that in connection with the alignment of the sheet film relative to the center line 8 of the device, constant access of a sheet-film removal means is possible, independently of the film format.

The lower portion 1 and the cover 2 with lid 3 engage to form a labyrinth-like arrangement so that the closed supply magazine 1, 2 is light-tight.

The unloading area of the supply magazine 1, 2 is designed such that when cover 2 is screwed in position and lid 3 is open, a stack of film sheets can easily be loaded into the supply magazine 1, 2 in the direction of the arrow "A". The supply magazine 1, 2 is reloaded in a darkroom.

In order that the unloading area is sufficiently deep for access, the longer plug-in bars 6 are used to define the sides of the sheet stack receiving space under lid 7. Bars 6, as shown in FIG. 2. are sufficiently lone to extend inwardly beyond hinge pin 4, so that the upwardly extending projection 6a on the inner end of each bar 6 plugs into a recess in cover 2. There is no projection-receiving recess in lid 7, hence an upwardly extending projection is provided at only one end of each of the long bars 6. As shown in FIG. 2. long bars 6, and also the shorter bars 5, have a depth from top edge to bottom edge, between their respective projections, substantially equal to the distance between the upper surface of bottom 1a of lower portion 1, and the bottom surface of upper portion 2, these being the surfaces in which recesses 1c and 2a are formed. Thus bars 5 and 6 bridge the vertical distance between the bottom and the cover.

The longer plug-in bars 6 always have to be inserted such that the individual projection 6a points upwardly and is adapted for engagement with recess 2a in the cover. For this reason, and in order that the long plug-in bars 6 can be accommodated close to each other in a space-saving manner to be described, the bars have left/right marks related to the center line 8 of the device.

The short plug-in bars 5 which are used in the area permanently covered by cover 2 do not require any left/right alignment as all of their projections 5a extend beyond their upper and lower edges, respectively, and thus cooperate with a recess 2a in cover 2 in any position.

Figure 4:
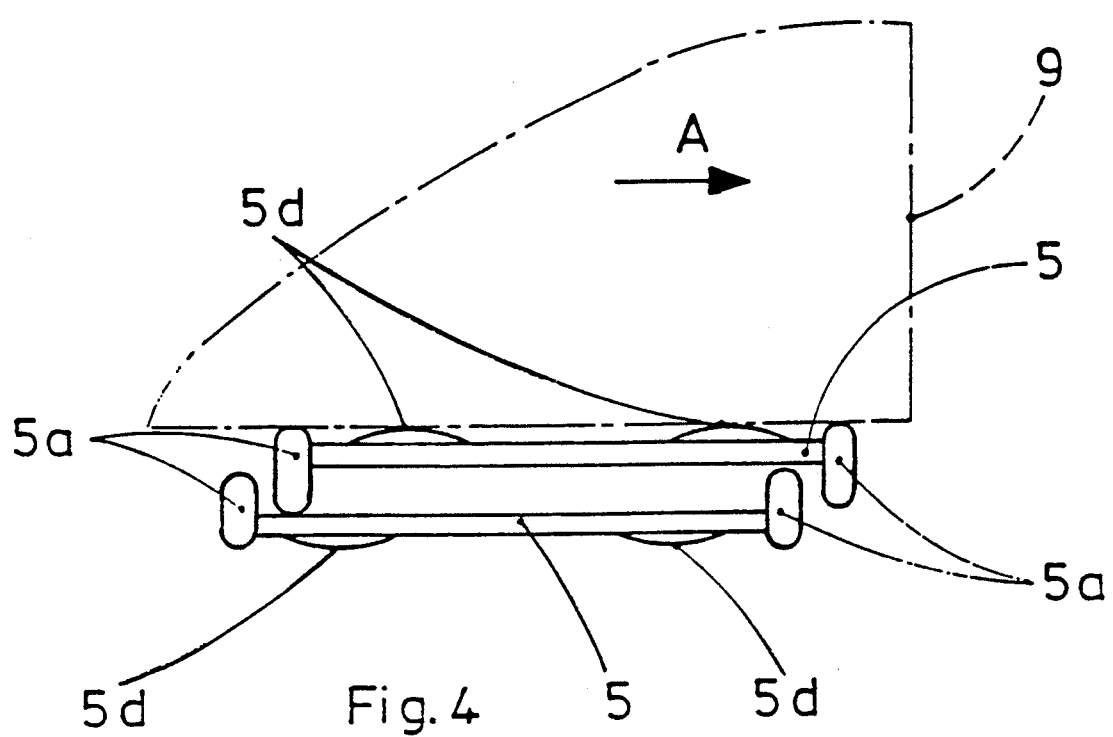
FIG. 4 is a plan view of the plug-in bars.

As can be seen in particular from FIG. 4. the plug-in bars 5 (and 6) are designed such that the sheet film 9 does not rest against the connecting bridge but always against projections 5a and 6a, respectively, which project upwardly and are continuously parallel with each other from the top to the bottom.

The end-side projections 5a, 6a have a substantially oval cross-section extending transverse to the length of plug-in bars 5, 6, as can be seen from FIG. 4.

In order to prevent the film sheets from striking against a projection 5a and 6a, respectively, when the supply magazine 1, 2 is loaded in the darkroom and the sheet film stack is not in a proper position, the plug-in bars 5 and 6 have a ball-shaped thickened area or bulge 5d arranged in the direction of insertion in front of the projection 5a and 6a, respectively. The stack of film sheets to be loaded is safely guided by these bulges 5d to the respective stack position without there being the danger of the stack getting jammed.

As can be seen from FIG. 4, the bulges 5d are arranged only on one side of each plug-in bar 5. 6 and do not extend beyond the size-defining plane formed by the projections 5a, 6a. The short plug-in bars 5 which can be selectively placed at the left or the right side are provided with two bulges 5d associated with the end-side projections 5a. The long plug-in bars 6 which have to be inserted in a predetermined left/right alignment are each provided with only one bulge 5d which is located in the direction of insertion in front of projection 6a. Due to the fact, that the bulges 5d are arranged at one side, which is advantageous because they are injection-molded, the plug-in bars 5 arranged parallel with the direction of insertion "A" have to be placed such that their bulges 5d face the center line 8 of the device. The transverse plug-in bars 5, that is, those inserted parallel with the inner wall 1f, need not be aligned in this way because they do not serve for guiding the sheet-film stack as it is loaded into the supply magazine.

Figure 3:
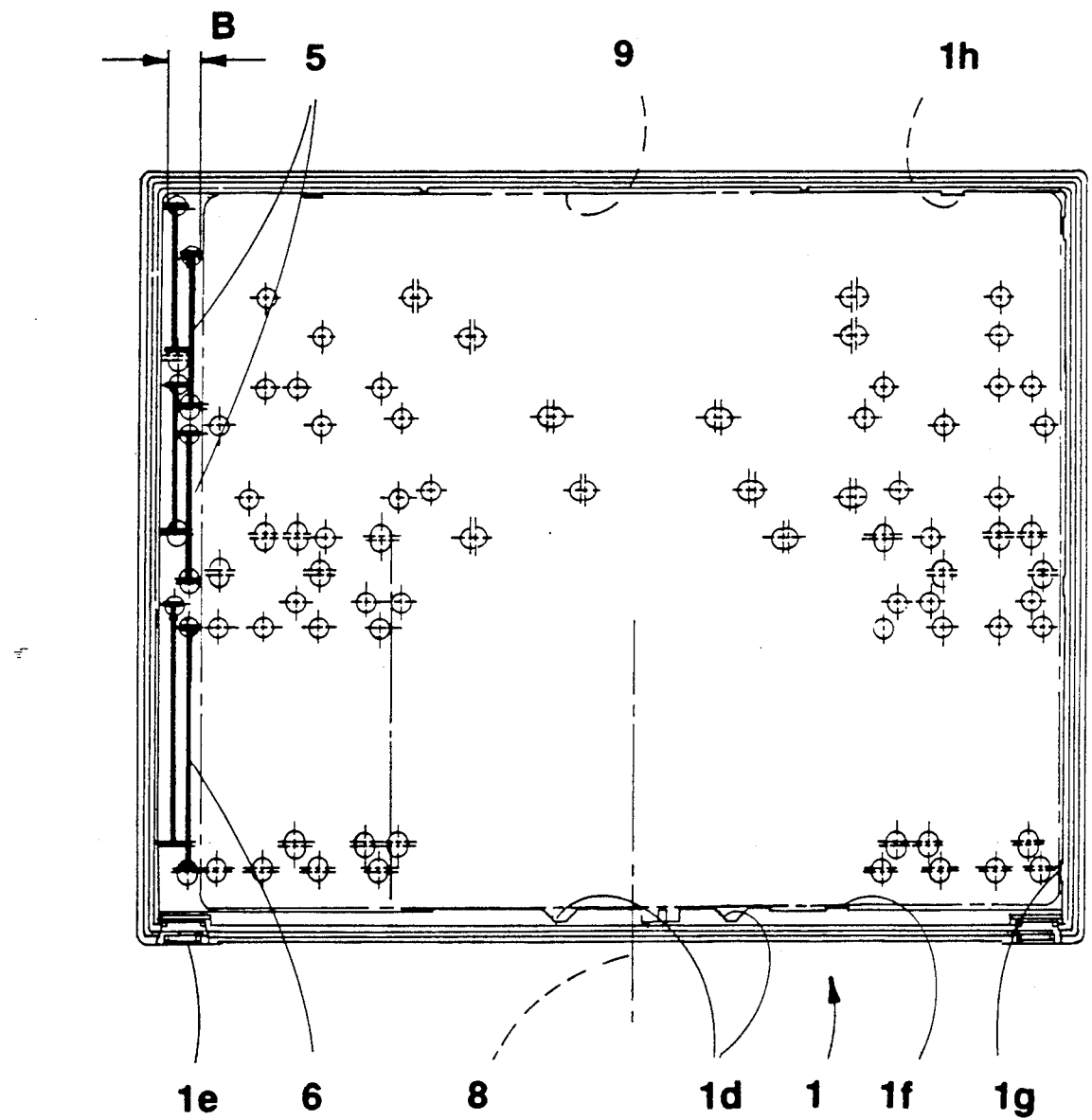
FIG. 3 is a plan view of the container according to FIG. 1, with the "largest film format" setting.

As shown in FIG. 4 and in the plan views, the plug-in bars 5, 6 are located off center with respect to their respective projections 5a, 6a so that these bars can be accommodated very compactly in a staggered arrangement, as can also be seen from those views, particularly FIG. 3. Said another way, the projections are located off-center with respect to the longitudinal axes of the bars so as to project farther from one side of the bars than from the other.

The engagement of the projections 5a and 6a, respectively, with the associated recesses 1c and 2a, respectively, in the lower portion 1 and the cover 2, respectively, ensures that film sheets 9 are properly positioned from the first to the last sheet because they cannot slip over or underneath the plug-in bars 5 and 6, respectively.

The inner space (interior) of the lower portion 1 is designed such that when the largest possible sheet-film format (e.g. 35×43 cm) is used, three inner walls 1f, 1g, 1h serves as boundaries. The fourth side of the sheet-film format is defined by an inner row of one long and two short plug-in bars 5 and 6, respectively. In this connection, see FIG. 3. As can be seen from that FIG..

the inner space of the lower portion 1 is enlarged beyond the largest format size by an amount "B" at the side defined by the plug-in bars 5, 6 so that there is enough space for the three size-defining plug-in bars 5, 6 and for the other three plug-in bars 5 and 6, respectively, which are arranged parallel therewith and are not used. The enlarged lateral area "B" required for that purpose is relatively small owing to the advantageous arrangement of plug-in bars 5 and 6 as shown in FIG. 4. The enlarged area "B" permits the film storage area in FIG. 3 to be symmetrical about center line 8.

As can be seen in particular from the embodiment according to FIG. 3, all plug-in bars 5, 6 (two long and four short plug-in bars 5 and 6, respectively) remain in the supply magazine 1, 2 and cannot get lost even if the entire possible space is required (largest sheet film format). Consequently, the supply magazine 1, 2 can be adapted to the desired film format at any time because the plug-in bars 5, 6 are always stored in the supply magazine 1,2, using when necessary, the suitably located recesses in the area "B" of magazine 1,2.

When another film format, e.g. 24×24 cm, is selected, the arrangement according to FIG. 1 is used, all plug-in bars 5 and 6 being employed. Each of the two parallel sides are defined by a long plug-in bar 6 and a shorter plug-in bar, while two short plug-in bars 5 are placed parallel with the front inner wall 1f.

Figure 7:
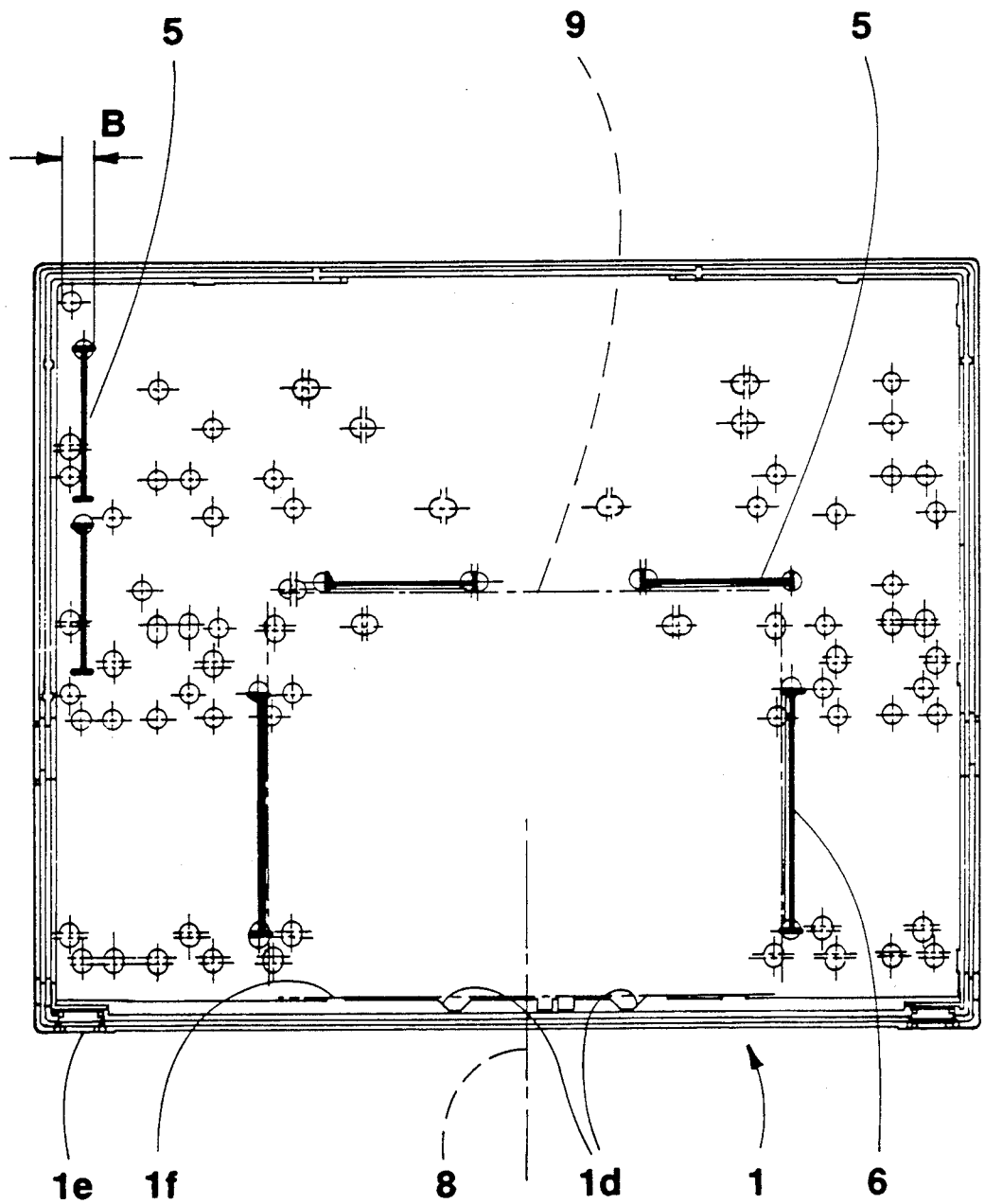
FIG. 7 shows the container according to FIG. 1, with the "smaller film format" setting.

If a rectangular film format, e.g. 8"×10", is selected, the arrangement shown in FIG. 7 is used. In this case, only the two long front plug-in bars 6 and two short plug-in bars 5 arranged parallel with the inner wall 1f are inserted. The two short plug-in bars 5 not required, remain in the lower portion 1 and are preferably stored in the enlarged area "B". However, the plug-in bars 5 not used can also be stored in any suitable recesses 1c outside the desired film format.

Figure 8:
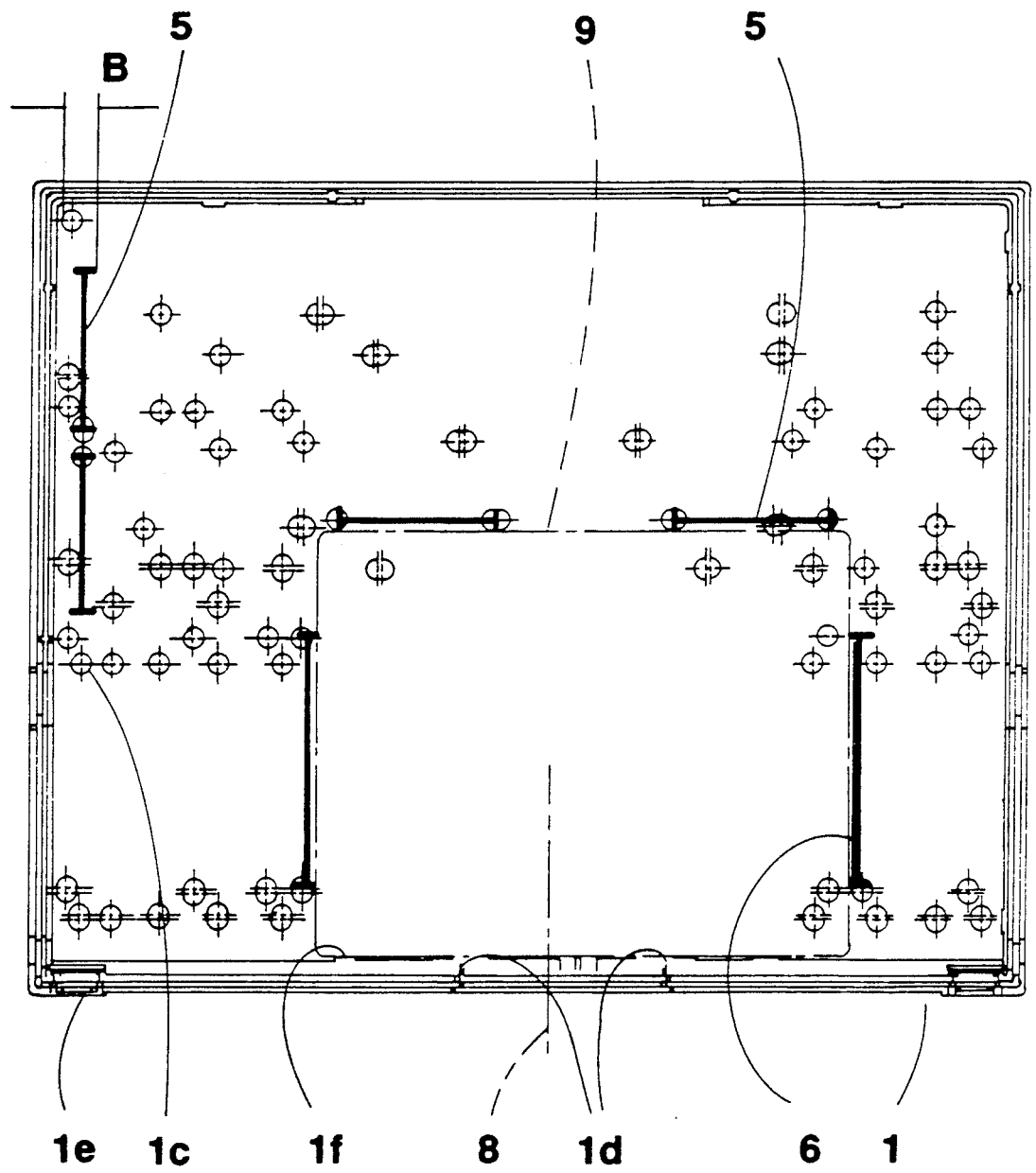
FIG. 8 shows the container according to FIG. 1 with a film format being set which is displaced relative to the center.

FIG. 8 shows an arrangement of the plug-in bars 5 and 6 for the same film format 8"×10" that has been described above, however in a different orientation not symmetrical about center line 8 of the device. This embodiment shows that the supply magazine 1, 2 can also be loaded with film sheets which are to be transported to sheet-film cassettes not in alignment with the center of the format, e.g. CRT cassettes. The displacement of the boundaries of the format (plug-in bars 5 and 6) relative to the center line 8 of the device exactly corresponds to the eccentric placement of the sheet film of a CRT cassette in the loading station of a loading device mentioned at the beginning. Even if the supply stack of film sheets is thus displaced the sheet film can be unloaded and transferred by the same sheet-film removal means without any changes having to be made.

In the supply magazine 1, 2, sufficient recesses 1c and 2a, respectively, are provided for several film formats, for example, 18×24 cm; 18×43 cm; 20×40 cm; 24×24 cm; 24×30 cm; 30×35 cm; 30×40 cm; 35×35 cm; 35×43 cm; 8"×10" and 11"×14".

The recesses 1c in the lower portion 1 may be associated with indicia relating to the film format for which they are used. For example, for 18×24 and 18×43 formats, the plug-in bars 5 arranged parallel with the inner wall 1f are placed into the recesses 1c in the lower portion 1, which are marked "18". In the case of the 18×24 format, the long plug-in bars 6 are placed closer to the center line 8 of the device as can be seen from FIG. 7, while they are placed in the storage area "B" in the case of the format 18×43 (not illustrated).

As shown in FIG. 7, only the inner projection 5a of the right hand plug-in bar 5 serves for defining the size in the one case (18×24), whereas in the case of the longer format (18×43) (not shown), both projections 5a define the size, along with both projections of the left band bar 5.

This example of the handling of film formats having two identical side lengths shows that when the recesses 1c, 2a for the plug-in bars 5 and 6 are positioned ingeniously; the inner space of the lower portion 1 can be easily adapted to the desired film format despite the great number of film formats. The above-mentioned marking of the recesses 1c in the lower portion 1, associated with each film format, makes it even easier to set up the desired format.

In the front inner wall 1f, recesses 1d are provided into which suction nozzles of a sheet-film removal means (not illustrated) can enter, such nozzles being directed toward the front edge of the sheet film and serving for separating the individual film sheets.

Each supply magazine 1, 2 can be provided at one outer end wall with printed data and a machine-readable code associated with the film format set.

Figure 5:
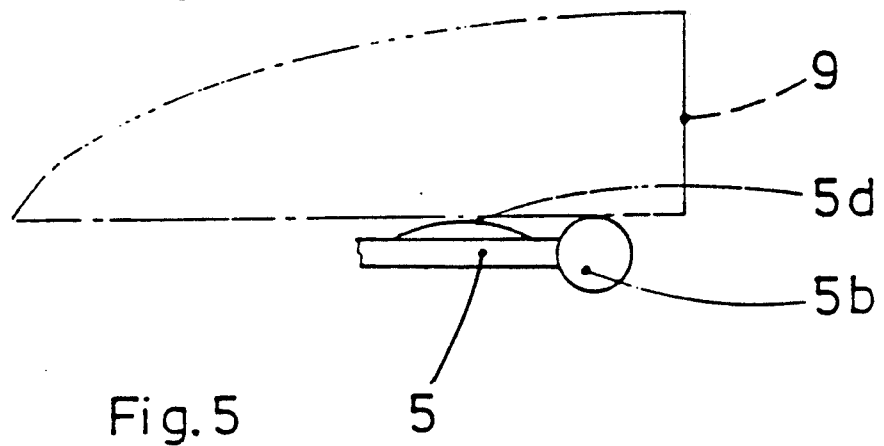
FIG. 5 is a partial plan view of a second embodiment of the plug-in bars.
Figure 6:
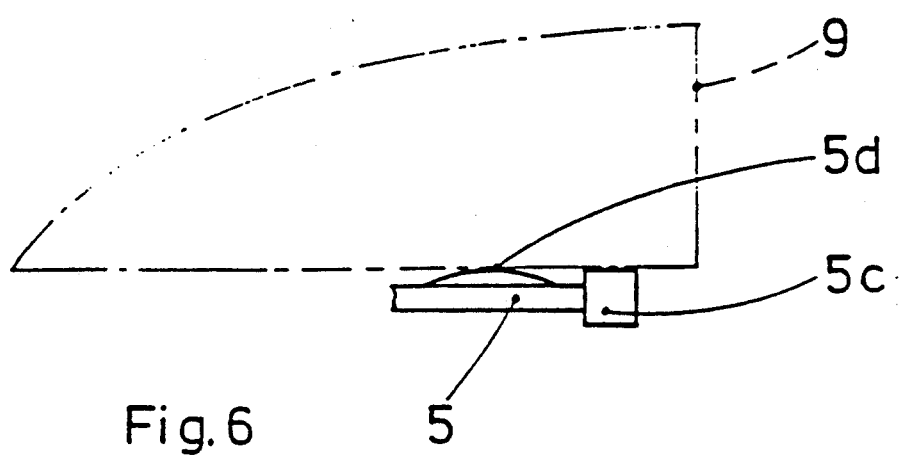
FIG. 6 is a partial plan view of a third embodiment of the plug-in bars.

Contrary to the embodiment shown, the projections of the plug-in bars 5 and 6 can also be circular 5b or rectangular 5c, as shown in FIGS. 5 and 6, respectively.

Although the design of the plug-in bars 5 and 6 with projections 5a (or 5b or 5c) and 6a, and the bulges 5d is advantageous because they are injection-molded, the plug-in bars may also have different shapes. The plug-in bars facing the size-defining side can, for instance, have a surface (not illustrated) connecting the projections 5a and 5b, and 5c, respectively, and 6a, which is substantially uninterrupted and straight or slightly concave, and also ensures easy loading of the supply magazine 1, 2.

Instead of plug-bars, insert plugs (without connecting bars) can be used (not shown) which are placed into the recesses 1c and 2a, respectively, of the lower portion 1 and the cover 2, respectively. Such plugs may have a cross-section as shown, for instance, in FIGS. 4 to 6 (oval, circular or rectangular). They are dimensioned to bridge the vertical distance between the lower portion and the cover, and their end parts exceed that dimension so as to enter recesses 1c and 2a.

The invention has been described with reference to a preferred embodiment. However, it will be appreciated that variations and modifications can be effected within the ordinary skill in the art without departing from the scope of the invention.

We claim:

1. A container for receiving and positioning a stack of photographic sheets such as X-ray film having any of several different size and shape formats, said container comprising a lower portion and a cover, said lower portion having a substantially flat, sheet supporting upper surface and including a plurality of recesses in said upper surface arranged in a predetermined pattern, and said container further comprising a plurality of elements, each of a dimension which bridges the vertical distance between said lower portion and said cover, for contacting the edges of sheets stacked in said container so as to position the edges of said sheets, at least one part of each said element exceeding said dimension and being adapted to selectively enter a selected recess of said plurality of recesses in accordance with the format of the sheet stack to be placed in the container so that the respective elements can be disposed so as to provide sheet edge positioning for the sheet stack of said format.

2. A container as set forth in claim 1, further comprising:
said cover also having recesses, said recesses in the cover being in its bottom surface and being located opposite and in overlying alignment with corresponding recesses in said lower portion, one of said parts of each said element being adapted to enter any selected one of said recesses in said bottom, and one of said parts of that element being adapted to enter at the same time a corresponding one of said recesses in said cover.

3. A container as set forth in claim 2, further comprising:
said elements being elongated, said parts being upwardly and downwardly extending projections at the ends of said elements.

4. A container as set forth in claim 3, further comprising:
said recesses in said lower portion being paired to match the spacing of said projections, and said recesses in said cover being similarly paired.

5. A container as set forth in claim 3, further comprising:
said projections of some of said elements comprising two of said parts extending in opposite directions, one part being adapted to enter a recess in said lower portion and an oppositely extending part being adapted to enter a corresponding recess in said cover.

6. A container as set forth in claim 3, further comprising:
said elements being of two different lengths.

7. A container as set forth in claim 5, further comprising:
said elements being of two different lengths, said elements of the longer length having at one end, only a projection adapted to enter a recess in said lower portion.

8. A container as set forth in claim 3, further comprising:
said projections on each said element also extending laterally beyond the sides of the element, and farther from one side than from the opposite side.

9. A container as set forth in claim 8, further comprising:
said elements having on the side facing the film stack space, a bulged area extending from the element a distance less than said laterally extending projections.

10. A container as set forth in claim 1, further comprising:
said container being dimensioned to provide a storage area along one lateral portion thereof beyond the edge of the largest size of sheet to be accommodated, said lower portion and said cover in said storage area having said recesses each to receive a said part of a said element to provide storage for said elements in positions which provide sheet edge positioning for sheets of said largest size.

11. A container as set forth in claim 1, wherein said predetermined pattern of recesses defines at least three rows of recesses each containing at least two recesses and at least three columns of recesses each containing at least two recesses.

* * * * *